Figure 5:
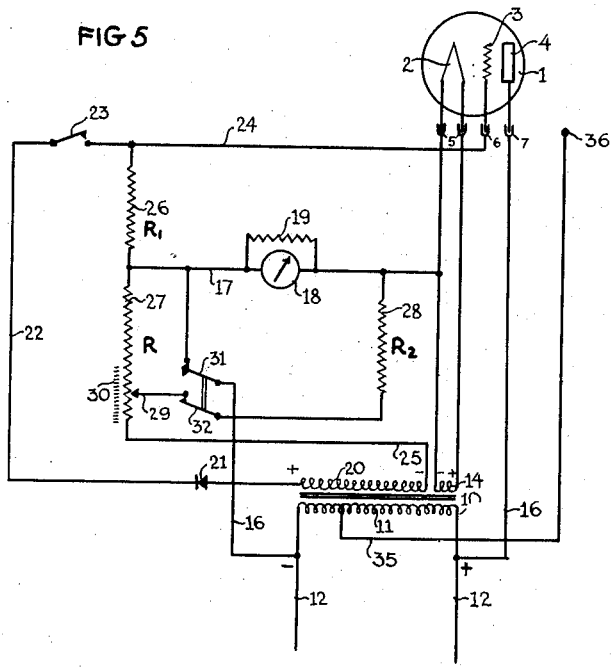

July 18, 1933.  D. E. SPARKS  1,918,495
TUBE TESTER
Filed June 6, 1930  3 Sheets-Sheet 1
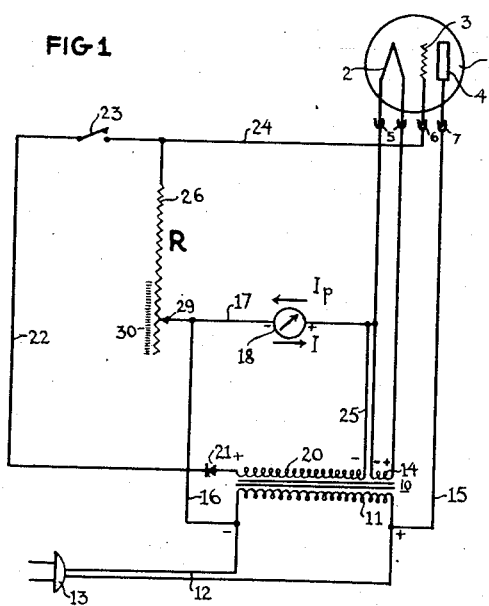
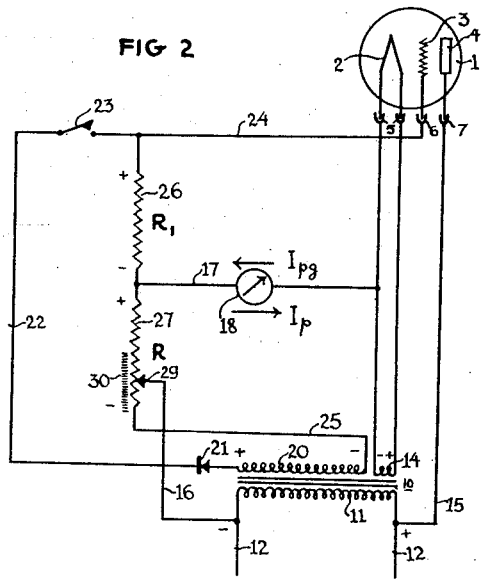
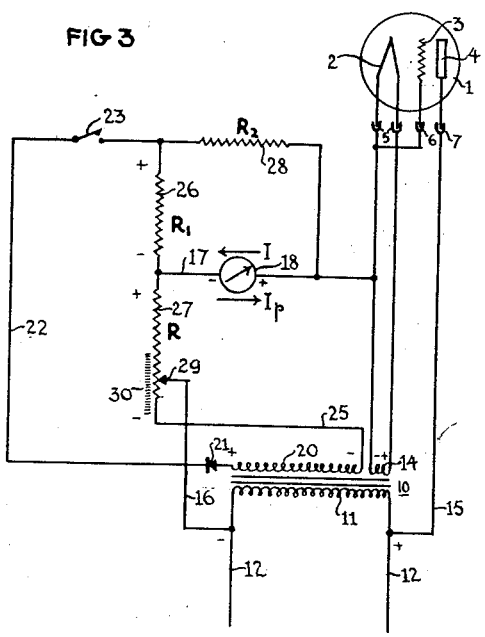
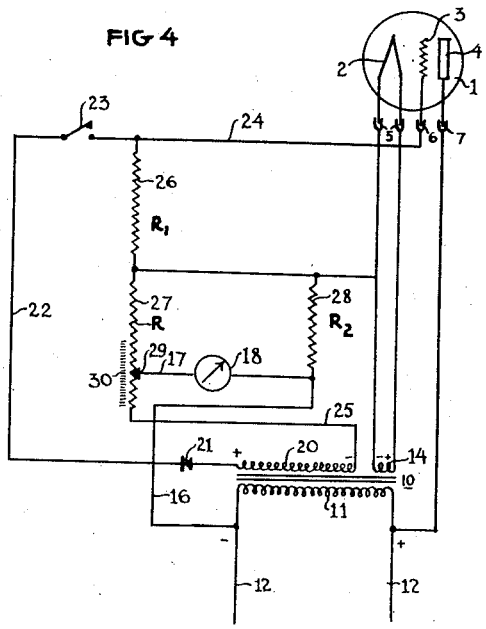
INVENTOR.
D E Sparks
BY Cromwell Greist Warden
ATTORNEYS.

July 18, 1933.  D. E. SPARKS  1,918,495
TUBE TESTER
Filed June 6, 1930  3 Sheets-Sheet 2

INVENTOR.
D E Sparks
BY Cromwell Greist & Warden
ATTORNEYS.

July 18, 1933.  D. E. SPARKS  1,918,495
TUBE TESTER
Filed June 6, 1930   3 Sheets-Sheet 3

INVENTOR.
J. E. Sparks
BY Cromwell Greist & Warden
ATTORNEYS.

Patented July 18, 1933

1,918,495

UNITED STATES PATENT OFFICE

DAVID E. SPARKS, OF CHICAGO, ILLINOIS

TUBE TESTER

Application filed June 6, 1930. Serial No. 459,479.

This invention relates to tube testers, and it has among its objects the provision of improved apparatus and methods for testing grid-controlled electron tubes or the like by means of commercial alternating current.

According to the invention, the principal characteristics of grid-controlled electron tubes or the like, such as the mutual conductance, plate impedance and amplification factor, are determined by applying an alternating current potential from the normally available commercial alternating current source to the plate circuits of the tubes while applying to the control grid a potential derived from a rectified alternating current flow from said source.

The foregoing and other objects of the invention will be best understood from the following description of exemplifications thereof, reference being had to the accompanying drawings wherein Figs. 1 to 7 are diagrammatic views of tube testing arrangements embodying my invention.

With the enormously increased use of radio tubes and the continuously multiplying sales thereof, there has been for some time past a very urgent demand for a reliable tube tester by means of which the qualities of the tubes could be determined by the salesman at the time the tube is purchased. The stores and in general, the places where tubes are bought, are as a rule supplied with ordinary alternating current and there has been existing, as a result, a special demand for a tube tester that would be operated from a regular alternating current tap on the domestic line circuit, and yet enable the dealer as well as the layman purchaser to see at a glance whether the tubes purchased have the characteristics required for satisfactory operation in the sets for which they are bought.

With a view to supplying such demand, there have been developed in the past two types of alternating current operated tube testers. One type is known as the emission tester and is arranged so that the full alternating current plate potential is applied to the grid and plate in parallel, and the total emission of the filament is measured with a current-indicating instrument connected in the plate circuit. Because of the lack of correlation between the total emission and the true merit of the tube, this test is of little value in determining the usefulness of tubes for a particular service, and this type of tester has found very little use.

The other type of tester, which has found wide utilization, is the so-called "grid-swing tester", such as described in my co-pending application Serial No. 236,044, filed November 28th, 1927. In this type of instrument, the plate circuit was energized from an alternating current source, and at the same time, different alternating current voltages were applied to the grid, and the resulting variations of the plate current measured. The changes of the plate current so produced were used as a measure of the mutual conductance of the tube. The limitations of this type of testing apparatus are manifold. First, the testing procedure is rather involved. It is first necessary to know the plate current with one potential applied to the grid, then to know the plate current with another potential applied to the grid, and third, to subtract one reading of the plate current from the other and determine the change of the plate current. Thus the procedure requires three operations, two consisting of observations of the plate current, and the third involving a mental calculation.

The second limitation lies in the fact that the merits of the tube are determined not in terms of the mutual conductance, but rather in terms of the change in plate current. With the greatly increased number of tube types, the testing of the tube qualities by the determination of the change in the plate voltage in the manner described above proved inadequate, and as a result, there has been existing a very strong demand for an instrument and a method of tube testing using ordinary alternating current whereby the mutual conductance rating and other important characteristics of the tubes would be obtained by a single direct observation on a calibrated scale.

I have found that by energizing the plate circuit of the tubes from an alternating current source and at the same time applying to the grid a potential derived from a rectified alternating current flow from said source, arrangements may be obtained whereby the mutual conductance of grid-controlled tubes, their amplification factor and plate impedance may be read off directly on a scale of the instrument.

In the exemplification of my invention shown in Fig. 1 a tube 1 comprising a filamentary cathode 2, a control grid 3 and a plate 4, that is to be tested, is arranged to be mounted in a socket of the testing instrument, the terminals of the tube electrodes engaging respectively, the cathode socket terminals 5, the grid socket terminal 6 and the plate socket terminal 7 of the socket. The tube and the testing circuits thereof are arranged to be energized from a transformer 10 have a primary winding 11 that is energized with ordinary alternating current from a house source through conductors 12 leading from a plug 13 that may be inserted in a wall socket of the familiar type. A secondary winding 14 of the transformer is connected to the socket terminals 5 and serves to supply the cathode filament 2. The plate terminal 7 is connected through a conductor 15 to one of the supply conductors 12 of the transformer. The plate circuit is completed by a conductor 16 connected to the other supply conductor 12 of the transformer and leading through conductor 17 and meter 18 to one of the filament supply conductors.

A special input supply circuit is provided for the tube leading from a secondary transformer winding 20 through rectifier 21, conductor 22, switch 23, a resistance 26, variable tap contact 29, conductor 17, meter 18 and conductor 25, back to the winding 20. From this circuit a potential is applied to the grid 3 of the tube by means of the conductor 24 leading from switch 23 to the grid socket terminal 6.

Assuming that the transformer 10 is energized from a house current source of 110 volts alternating current and the several transformer windings 11, 14 and 20 are poled relatively to each other as indicated by the (−) and (+) signs on the respective windings, and with the switch 23 open, a current will flow in the plate circuit of the tube from plate 4 to the cathode 2 and thence by way of the meter 18 in the direction of the arrow $I_p$, through conductor 16 to the other terminal of the supply source. The meter 18 will then have a certain deflection indicating a certain plate current flowing through the tube. The current flowing through this plate circuit has the form of rectified current impulses, current flowing only during the half cycle when the plate 4 is positive, there being no plate current during the half of each cycle when the plate is negative. No current flows at the moment through transformer winding 20 and rectifier 21, as the switch 23 is open. The grid 3 will accordingly be substantially at the potential of the cathode 2 by reason of its direct connection through the currentless resistor 26 to the cathode lead from transformer winding 14 to cathode socket terminal 5.

If the switch 23 is closed, an additional current flow is established from the transformer winding 20 by way of the rectifier 21, switch 23, resistor 26, meter 18, and return conductor 25, this current flow being likewise in the form of rectified current impulses, the current flowing only during the half of each cycle when the voltage induced in transformer 20 is in the conductive direction of the rectifier 21. This flow of current by way of the resistor 26 produces across said resistor a voltage drop which is applied through the conductor 24 to the grid 3. The applied grid voltage produces a change in the plate current and it is the balance of this plate current change, produced by the voltage applied to the grid, against the current flow from the rectifier 20 effected by the closure of the switch 23 that I utilize for direct determination of the mutual conductance of the tube 1 that is tested.

In accordance with my invention, I arrange the polarity of the transformer winding 20 and of the rectifier 21 in the circuit thereof so that current pulses flow across the resistor 26 during the half cycles when the current pulses flow in the plate circuit of the tube by way from the plate to the cathode. The circuit arrangement as shown in the drawings is made such that the direction of flow of the rectified current from the transformer winding 20 by way of the meter 18 is opposite to the direction of the current change produced by the application of the potential drop across the resistor 26 to the grid 3 of the tube. Thus, for instance, with the polarity of transformer winding 20 and rectifier 21 as indicated in the drawings, if the current from the transformer winding 20 through the resistor 26 upon the closure of switch 23 is designated as I, and the change in the plate current flow produced by the application of the voltage drop across the resistor 26 is designated as $I_p$, then the two will have the directions indicated by the arrows I and $I_p$ in the drawings, being opposite to each other. By sliding the variable contact tap 29 along the resistance 26 the value of said resistance may be so adjusted as to make the change of the plate current $I_p$ equal to the current I produced by the closure of the switch 23 so that closure of the switch 23 does not change the deflection of the meter 18 against the position indicated by the meter when the switch 23 is open. In other words, for instance, if the meter 18, with the switch 23 open, indicates, say 8 milliamperes, the resistance 26 may be so adjusted so that on closure of the switch 23 the meter indication remains 8 milliamperes, showing that the application of the control voltage to the grid 3 produced a change in the plate current which is equal and opposite to the current flow established through the resistor 26 by the closure of switch 23. It can be shown that under such conditions the mutual conductance of the tube is equal to the conductance of the part of the resistor 26 included in the circuit of the transformer winding 20, or designating the included resistance by R and the mutual conductance of the tube $G_m$, we have $$G_m = \frac{1}{R} \quad (1)$$

In order to permit direct reading of the mutual conductance of the tube on the instrument, I provide a scale 30, calibrated so that the adjustment of the contact tap 29 on the resistor 26 gives on the scale direct readings of the mutual conductance of the tube.

The theory of operation of this device may be explained as follows:

The mutual conductance of the tube is given by the equation $$G_m = \frac{I_p}{E_g} \quad (2)$$

wherein $I_p$ is the change of the plate current produced by a change of the grid voltage equal to $E_g$.

Making $$I = I_p \quad (3)$$

as explained above, we have, $$E_g = I \times R \quad (4)$$

Substituting in (2) we obtain $$G_m = \frac{I}{IR} = \frac{1}{R} \quad (5)$$

so that $\frac{1}{R}$ is a measure of the mutual conductance of the tube.

The values of mutual conductance obtained with an arrangement as shown in Fig. 1 are somewhat different from the values of mutual conductance as obtained by the standard direct current methods. This is due to the fact that, as distinguished from direct current methods, where a constant D. C. plate voltage and D. C. grid voltages are applied to the tube electrodes, in the arrangement of my invention pulsating voltages are applied to the electrodes of the tube. Accordingly, the mutual conductance measured by my arrangement is the quotient of the average plate current change over the average grid potential applied to the tube. The differences in the results of the measurements obtained with my arrangement as against ordinary direct current methods are however unobjectionable because for every practical purpose, the mutual conductance reading obtained by my arrangement is just as good an indication of the performance characteristics of the tube as one obtained with direct current methods. In other words, what may be called the average mutual conductance of the tube obtained by my arrangement is for every practical purpose as fully an indication of the performance characteristics important for the operation of the tube in ordinary radio receiving sets as that obtained by direct current methods. In some respects, the mutual conductance value of the tube obtained by means of my arrangement gives a better evaluation of the operating characteristics of the tube, since it indicates the average performance over a range of operating voltages under which the tube is likely to be used, whereas the ordinary direct current methods indicate the performance only under a fixed set of operating conditions.

In the example shown in the drawings, the transformer winding 20 and the rectifier 21 are so poled against the primary transformer winding 11 that when the switch 23 is closed, a positive potential is applied by the drop across the resistor 26 to the grid 3 of the tube. As a result, the application of such grid potential gives an increase in the plate current of the tube, which current increase is indicated by the direction of the arrow $I_p$ in the drawings.

The arrangement will also operate if the polarity of the transformer winding 20 and of the rectifier 21 is reversed so that on closing the switch 23, the rectified direct current will flow in the direction from transformer winding 20 through conductor 25, meter 18, conductor 17, resistor 26, switch 23, conductor 22, rectifier 21, back to the winding 20, the current being in this case in the direction opposite to the arrow I. This current flow will produce a negative voltage drop across the resistor 26 so that the potential applied to the grid 3 will be negative with respect to the cathode 2, resulting in a decrease of the plate current corresponding to a direction of flow opposite to the arrow $I_p$ in the drawings. Accordingly, with such reversed arrangement of polarity of the transformer winding 20 and rectifier 21, the current flow in the auxiliary circuit and the change in the plate current due to the application of the negative grid potential will again oppose each other in the meter 18 and as in the instance described above, when the contact tap 29 is so adjusted that these currents are equal and opposite, and closure of the switch 23 has no effect on the deflection of the meter, the conductance of the part of the resistor 26 included in the circuit will be a measure of the mutual conductance of the tube 1.

For the proper operation of the device, it is absolutely essential that no matter in which direction the current flows in the circuit of the transformer winding 20 and the rectifier 21, the current flow takes place during the half-cycle when current flows from the plate to the cathode. For instance, if the circuit arrangement had the transformer winding 21 poled as shown in Fig. 1, but the rectifier 21 connected with reverse polarity, the arrangement would fail to operate in the manner contemplated for producing an indication of the mutual conductance of the tube because the current in the circuit of the transformer winding 20 would flow during the half cycle when no current is flowing in the plate circuit, so that the resulting application of a grid potential to the grid 3 would have no effect on the operation of the tube and the current I through the meter 18 would have no meaning as far as a comparison with plate current conditions is concerned.

The idea underlying my invention, namely the application to the grid of auxiliary voltage derived from a flow of rectified current from the alternating current source is not limited to arrangements for determining the mutual conductance of the tube but it is likewise applicable to a variety of other arrangements, for instance, for determining the amplification factor or the plate impedance of the tube.

An arrangement for determining the amplification factor is shown diagrammatically in Fig. 2. A three-electrode tube 1 like the tube shown in Fig. 1 is arranged for mounting in a socket having socket terminals 5, 6, and 7. The cathode and plate are energized from a transformer 10 in a way similar to the arrangement of Fig. 1, a meter 18 being included in the return circuit of the plate and the cathode. An auxiliary circuit is arranged to be supplied from a transformer winding 20 through a rectifier 21 and the switch 23, the auxiliary circuit including two resistors 26 and 27. The amount of resistance included in the plate circuit may be varied by means of a slidable contact member 29 on the resistor 27. When the switch 23 is open and the tube 1 mounted in place, with the transformer winding 11 energized from the alternating current line, a current will flow in the plate circuit of the tube from plate 4 to cathode 2 by way of the meter 18, producing a deflection of the meter. On closing of switch 23, an auxiliary rectified current flow will be produced from transformer winding 20 by way of the resistance 26 and 27. The voltage drop across resistor 26 is applied through the conductor 24 to the grid, producing a change in the plate current which may here be designated as $I_{pg}$, this current being indicated in the drawings by a correspondingly designated arrow. There is also produced a voltage drop across the part of the resistor 27 leading to the contact tap 29, which voltage drop is directly in the plate circuit of tube 1 and acts, with the polarities of the elements as indicated in the drawings, subtractively relatively to the plate voltage applied by the connections of the plate circuit to the conductors 12 of the supply source. Accordingly, the plate voltage will be reduced and give a decrease of the plate potential. As a result, there will take place a change of the plate current produced by this decrease of plate potential, this change of the plate current being designated as $I_p$ and being shown in the drawings by a correspondingly marked arrow.

By adjusting the sliding tap 29 on the resistor 27, the current flow conditions in the auxiliary circuit through the resistors 26 and 27 may be varied so that upon closure of the switch 23, the current change $I_{pg}$ produced in the plate circuit by the variation of the grid potential will be balanced by the current $I_p$ produced in the plate circuit by the variation of the plate potential, so that the closure of the switch 23 will not affect the deflection of the instrument 18. Under such conditions, the part of the resistor included in the plate circuit is a measure of the amplification factor of the tube, and a scale 30 suitably calibrated in accordance with the resistance 27 will give a direct indication of the amplification factor. The theory of this arrangement may be explained as follows:

The increase in the plate current due to the application of the grid potential $E_g$ to the grid is given by the equation $$I_{pg} = \frac{u \times E_g}{R_p} \quad (6)$$

where $u$ is the amplification factor and $R_p$ is the plate impedance.

The change in the plate current produced by the change in the plate voltage due to the drop across the resistor 27 is given by equation $$I_p = \frac{E_p}{R_p} \quad (7).$$

If the tap 29 is so adjusted that $$I_{pg} = I_p \quad (8)$$

we have $$\frac{uE_g}{R_p} = \frac{E_p}{R_p} \quad (9)$$

and therefrom, $$u = \frac{E_p}{E_g} \quad (10).$$

Since $$\frac{E_p}{E_g} = \frac{R}{R_1} \quad (11)$$

where R designates the resistance of the part of resistor 27 included in the plate circuit, and $R_1$ the resistance of the resistor 26, we have $$u = \frac{R}{R_1} \quad (12).$$

As in connection with the arrangement for determining the mutual conductance as shown in Fig. 1, the value of the amplification factor obtained by the arrangement of Fig. 2 will differ from the values obtained with a direct-current instrument on account of the fact that the average values of the currents and voltages determine the amplification factor and not the fixed direct current values used in the direct current devices. However, for all practical purposes, the determination made as a result of such average value effects fulfills all the requirements that a measurement of the amplification factor is required to give to one concerned with the practical operation of the tube.

As in the arrangement of Fig. 1, the polarity of the transformer winding 20 and of the rectifier 21 must be so chosen that the rectified current impulses are produced in the auxiliary circuit including the resistance 26 and 27 during the half cycles when the plate potential is positive and there is no current flow through the tube. In the arrangement of the drawings, the transformer winding 20 and the rectifier 21 are so poled that on closing the switch 23 a positive potential is applied to the grid 3. The arrangement may also be used with the polarity of the transformer winding 20 and rectifier 21 reversed, in which case closure of the switch 23 will apply a negative potential to the grid 3, so that the directions of the currents through the meter will be opposite to those indicated by the arrows $I_{pg}$ and $I_p$.

In the arrangement of Fig. 3 I provide an instrument whereby the plate impedance of the tube may be determined under utilization of current derived from an alternating current source. The tube 1 having a cathode 2, and grid 3, is arranged for mounting in a socket having socket terminals 5, 6 and 7. In this arrangement, the grid socket terminal 6 is directly connected to one of the cathode socket terminals 5 of the instrument.

As in the arrangements described before, the tube circuits are energized from a transformer 10 having a primary winding 11 connected to supply line conductors 12 of an alternating current source. A secondary winding 14 supplies the cathode 2. The plate 4 is connected through conductor 15 to one terminal of the supply line. A transformer winding 20 supplies through a rectifier 21 and switch 23, an auxiliary circuit including the resistors 26 and 27. The plate circuit of the tube is completed by a conductor 16 leading from the other terminal of the source by way of a variable contact tap 29 through resistor 27, conductor 17, meter 18, to the cathode 2. An additional resistor 28 is connected in shunt to the resistor 26 and the meter 18. In operating the instrument, the tube is inserted in place as shown in the drawings, and the sliding contact tap 29 is adjusted on the resistor 27 until closure of the switch 23 does not vary the deflection of the meter 18. The resistance of the part of the resistor 27 included in the circuit will then be a measure of the plate impedance of the tube.

The theory underlying this arrangement is as follows:

The plate impedance of the tube is given by the equation $$I_p = \frac{E_p}{R_p} \quad (13)$$

wherein $I_p$ is the change of the plate current produced upon closure of switch 23, and $E_p$ is the change of the plate potential produced upon closure of switch 23. Closure of the switch 23 will also produce a current flow through the meter 18 given by equation $$I = \frac{E}{R_2} \quad (14)$$

where E is equal to the voltage drop across the resistor 26 and $R_2$ is the resistance of the resistor 27. When the contact tap 29 is adjusted so that the two currents $I_p$ and I balance each other, we have $$\frac{E_p}{R_p} = \frac{E}{R_2} \quad (15)$$

where R is the resistance of the part of the resistor 27 included by the tap 29 in the circuit through the plate 4.

Equation (15) gives for the plate impedance $$R_p = \frac{E_p}{E} \times R_2 = \frac{R \times R_2}{R_1} \quad (16)$$

where $R_1$ is the resistance of the resistor 26.

As in the arrangement described in Fig. 2, the values obtained correspond to the average values of the currents and voltages applied to the various circuit elements. The average results so obtained are fully satisfactory for all practical purposes.

As in the instances referred to before, the transformer winding 20 and the rectifier 21 must be so poled as to conduct current during the half cycle when the plate potential is positive. The transformer winding 20 and rectifier 21 may be used with the polarities as indicated in the drawings or with reverse polarities, in which case the changes of the current produced are opposite to those indicated in the drawings by the arrows I and $I_p$.

In Fig. 4 there is shown a modification of the arrangement of Fig. 1 for determining the mutual conductance of the tube. In this arrangement the cathode and plate electrodes are connected to the transformer 10 like in the device of Fig. 1. The transformer winding 20 is connected through a rectifier 21 and switch 23 to two serially connected resistors 26 and 27. The mid-point between these two resistors is connected to one of the cathode supply leads, which lead is also connected through the resistor 28 to one of the supply line terminals. The meter 18 is connected through a conductor 17 between the line terminal of the resistor 28 and the variable contact tap 29 slidably engaging the resistor 27.

As in the arrangement of Fig. 1, the mutual conductance of the tube is determined by inserting the tube in place and then shifting the slidable contact 29 along the resistor 27 until closure of the switch 23 does not affect the deflection of the meter 18. The amount of the resistance of the resistor 27 is then a measure of the mutual conductance of the tube. The theory underlying this arrangement is as follows:

The mutual conductance of the tube is given by the equation $$G_m = \frac{I_p}{E_g} \quad (17)$$

wherein $E_g$ is the grid potential applied to the grid, in this case by closure of the switch 23, and $I_p$ the plate current flow produced by the change of the grid potential $E_g$.

Substituting for $E_g$ and $I_p$ we have, $$E_g = IR_1, \quad (18)$$

being the voltage drop produced by the current flowing through the resistance $R_1$ of resistor 26 upon closure of the switch 23. When the current flow in the meter 18 has been balanced, the voltage drop across the resistance R of the section of the resistor 27 included in the circuit by the contact tap 29, and the voltage drop across the resistance $R_2$ of the resistor 28 are equal and we have $$IR = I_p R_2 \quad (19)$$

This gives $$I_p = \frac{IR}{R_2} \quad (20)$$

Substituting, we have $$G_m = \frac{IR}{R_2} \times \frac{1}{IR_1} = \frac{R}{R_1 \times R_2} \quad (21)$$

as the formula for the mutual conductance by the arrangement of Fig. 4. By providing a suitably calibrated scale, the mutual conductance can be directly read off from the adjustment of the tap 29 along the resistance 27.

The arrangement of Fig. 4 has the advantage over the arrangement of Fig. 1 in that the resistance term R, the magnitude of which determines the mutual conductance of the tube is in the numerator of the formula, so that the scale 30 will be uniform, and a more accurate determination of the mutual conductance will be obtained. In the formula for the arrangement of Fig. 1, R is in the denominator and the scale 30 will be non-uniform. For most practical purposes either arrangement 1 or arrangement 4 will be found useful.

As in the instances described before, the arrangement of Fig. 4 may be used with the polarity of the transformer winding 20 and the rectifier 21 either as shown in the drawings so as to apply a positive potential to the grid 3 upon closure of the switch 23, or with reverse polarities so as to apply a negative potential to the grid 3 upon closure of switch 23. It is of course understood that in this arrangement, the value of the mutual conductance is somewhat different from the values obtained with direct current measuring methods since the results are based on the average of the currents and voltages applied to the various elements of the arrangement.

The arrangement of Fig. 5 illustrates another modification for determining the mutual conductance of the tube under utilization of current from a commercial alternating current source, this arrangement being combined with provisions for also determining the amplification factor of the tube. The device comprises socket terminals for receiving the tube 1, and a transformer 10 arranged to supply the cathode and the plate of the tube as in the arrangement of Fig. 1. A transformer winding 20 is connected through a rectifier 21 and switch 23 to two serially connected resistors 26 and 27 and supplies the same with rectified current pulses during the periods when the plate 4 is at a positive potential. The meter 18, having shunted thereacross a meter shunt 19, is connected between the midpoint of the two resistors 26 and 27 and one of the cathode supply leads.

A double-pole switch having switch poles 31, 32, is so arranged that in the upper position as shown in the drawings, one pole of the alternating current supply line 12 is connected to the midpoint of the resistors 26 and 27, and a resistor 28 is connected between the cathode supply lead and a variable contact tap 29 engaging resistor 27. When the double-pole switch is thrown to the downward position, the circuit of the resistor 28 is opened and the lead 16 from the supply line conductor 12 is connected through switch pole 31 to the variable contact tap 29. When the double-pole switch 31, 32 is in the upper position as shown in the drawings, the arrangement of Fig. 5 will operate as a direct reading instrument for the determination of the mutual conductance of the tube 1. To operate the device, the tube 1 is inserted in place, whereupon the meter 18 will show a deflection corresponding to the plate current flowing in the circuit. The slidable contact tap 29 is thereupon adjusted along the resistor 27 until closure of the switch 23 will leave the normal deflection of the instrument unaffected. When this has been brought about, the resistance R of the part of the resistor 27 included by the tap contact 29 will give a direct measure of the mutual conductance of the tube and this mutual conductance can be directly read off the instrument from a suitably calibrated scale 30.

The theory underlying the operation of this arrangement for the determination of the mutual conductance of the tube is as follows:

Starting from the equation for the mutual conductance of the tube $$G_m = \frac{I_p}{E_g},$$

we may substitute $$E_g = IR_1 \quad (22),$$

this being the voltage drop across the resistance $R_1$ of the resistor 26 produced by the rectified current I flowing from the transformer winding 20 upon closure of the switch 23. Under conditions of current balance of the instrument, we have $$IR = I_p \times R_2 \quad (23)$$

where $R_2$ is the resistance of the resistor 28. Substituting in the equation, we obtain $$G_m = \frac{IR}{R_2} \times \frac{1}{IR_1} = \frac{R}{R_1 \times R_2} \quad (24)$$

as the formula for the mutual conductance, which as in the prior cases, is the average value.

When the instrument is used for measuring the amplification factor with the double-pole switch 31, 32 in the downward position, circuits are established which are in every respect like the circuits of the arrangement in Fig. 2 so that the amplification factor is given by the formula $$u = \frac{R}{R_1}.$$

It will be noted that in the arrangement of Fig. 5, a conductor 35 is tapped off from the primary transformer winding 11, leading to a contact terminal 36. This arrangement may be used in connection with testing of screen-grid tubes, the terminal 36 serving to supply a voltage source for the second grid of the tube. It will be noted that the arrangement is such that when the positive potential is applied by supply leads 12 to plate 4 through the socket terminal 7 leading to plate 4 of the tube, a lower but likewise positive potential will be applied by the transformer winding 11 to the grid terminal 36 of the instrument.

With the present commercial type of screen-grid tubes, the sockets are provided with four prongs arranged exactly like the prongs on the sockets for ordinary three-electrode tubes. In screen-grid tubes, the grid prong on the base is however not connected to the control grid of the tube as in ordinary three-electrode tubes, but to the screen grid, so that when a screen-grid tube is inserted in a socket such as shown in Fig. 5, the screen grid of the tube will be connected to the grid socket 6 and the control grid terminal of the tube which usually projects on the top of the bulb will be free for connection to the auxiliary grid supply terminal 36. When a screen-grid tube is so tested, namely with its screen-grid connected to the conductor 24 and the control grid connected to the terminal 36, it operates under somewhat different conditions than those under which the tube is normally intended to operate. However, such test may under certain circumstances be sufficient to give an idea of the operation of the tube. As will be explained hereinafter, in connection with Fig. 7, a second socket with a set of socket terminals may be provided on the instrument for use in connection with screen-grid tubes and so arranged that the terminals of the screen-grid tube are connected into operative circuits in the same relationship as they are commonly used, i. e. with the screen-grid connected to an auxiliary source of potential that is less positive than the plate potential, and the control grid is connected to a source of control voltage.

One of the difficulties that has to be contended with in the construction of a practical tube testing instrument that could be readily placed in the hands of dealers and other laymen, is the fact that there are on the market a great variety of tubes and the plate current of such tubes varies over a wide range. For instance, a type of tube known as 171—A will draw under normal plate voltage a plate current of about 25 milliamperes, while another typical tube known as A—226 will under similar conditions draw only about 5 milliamperes. Such widely different plate currents make it ordinarily necessary to use instruments having several ranges, for instance, one range to take care of high plate current tubes, and another for low plate current tubes.

In most cases, the mutual conductance of both high and low plate current tubes is of the same order of magnitude, despite the fact that their plate currents differ substantially from each other. This means that the change in plate current produced by a given grid voltage is approximately the same irrespective of whether the tube is a high or low plate current tube. The two meter ranges required for different ranges in a typical case are, say 0–20 milliamperes for the low plate current range and 0–100 milliamperes for the high plate current range. These ranges will take care of most of the tubes encountered in practice.

Because of these conditions, the accuracy of the readings or the measurements will greatly differ depending on whether a low plate current tube or a high plate current tube is tested. Let us assume that the change in the plate current for two tubes, one a low plate current tube and another a high plate current tube, will in both tubes be 4 milliamperes for a given change in grid voltage. The change of 4 milliamperes is readily and accurately observed on the 20 milliampere scale since the deflection of 4 milliamperes amounts to twenty per cent of the full scale deflection. However, on the 100 milliampere scale, the change of 4 milliamperes is only four per cent of the full scale deflection. Such a small deflection is very difficult to observe with any degree of accuracy and accordingly, the design of an instrument that would have equal accuracy for testing tubes with a low plate current rate as well as high plate current rate, is a matter of great practical concern.

One feature of my invention involves a very simple arrangement whereby these difficulties are avoided and substantially the same accuracy is obtained in determining the mutual conductance of high plate current tubes as in low plate current tubes. An exemplification of such arrangement is shown in Fig. 6 of the drawings.

Figure 6:
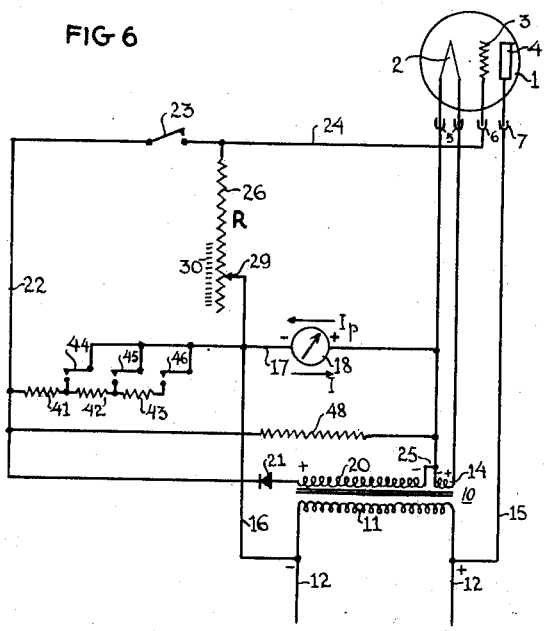

As will be seen from a comparison with the arrangement of Fig. 1, that of Fig. 6 has an additional auxiliary circuit between the conductor 17 and the conductor 22, the auxiliary circuit including resistors 41, 42 and 43 and switches 44, 45, and 46, by means of which more or less of said resistors may be included in an auxiliary circuit from the transformer winding 20 and rectifier 21 to the meter 18 included in the circuit of conductor 17. The function of this arrangement will be best understood by considering the case where the instrument has, say, a full scale deflection of 10 milliamperes and a tube having a normal current of 25 milliamperes is inserted into the socket terminals 5, 6, 7, for testing. Under such conditions, with the switches 44, 45 and 46 open, the plate current flowing through the meter 18 will throw the pointer past the full scale indication of 10 milliamperes. Now, by closing, say switch 46, an auxiliary circuit is established from the transformer winding 20 through the resistors 41, 42, 43 and the meter 18, sending a current in a direction opposite to the plate current. This current flow through the resistors 41 to 43 I term the "bucking current" as it bucks the plate current in the meter 18 and reduces the deflection of the meter by an amount corresponding to the bucking current. For instance, if the current flow through the meter is 25 milliamperes and the amount of resistance of the resistors 41, 42, 43 included in the bucking circuit is such as to produce a bucking current of 20 milliamperes, the deflection of the meter will correspond to an indication of 5 milliamperes. After the deflection of the meter has thus been brought within its normal range by closure of one of the switches 44 to 46, the device will function for the determination of the mutual conductance of the tube in the same way as the arrangement in Fig. 1, by adjusting the contact tap 29 until closure of the switch 23 does not vary the deflection of the instrument, say from the 5 milliampere reading when the switch 23 is open.

In order to conveniently buck out any plate current in excess of the normal meter range which may be encountered in testing the usual run of tubes, the resistors 41 to 43 included in the bucking circuits are arranged for connection in steps which vary the current through the meter circuits in multiples of the full scale deflection. Thus, if the meter full scale is 10 milliamperes, the resistors 41, 42 and 43 are so chosen as to produce bucking currents in steps of 10 milliamperes, 20 milliamperes, 30 milliamperes, etc. This will take care of any plate currents within the range of 10 to 20 milliamperes, 20 to 30 milliamperes, and 30 to 40 milliamperes, respectively.

Tubes having plate currents within the range of 0 to 10 milliamperes will fall within the scale of the meter without necessitating the use of bucking currents.

The arrangement of Fig. 6 is characterized by the advantageous feature that the same combination of transformer winding 20 and rectifier 21 which cooperates in the determination of the mutual conductance of the tube that is to be tested, also serves as the source of the bucking currents through the circuits of the testing instrument. In order to function properly in the way described above, the transformer winding 20 and the rectifier 21 must be so poled that the current flow through the bucking circuits shall be in a direction opposite to the flow of the plate current through the meter 18.

There must also be fulfilled the condition that the current flow in the circuits of the resistor 26 and meter 18 produced by closure of the switch 23 shall be opposed to the change of the plate current produced by the closure of switch 23. These combined requirements are fulfilled by poling the transformer winding 20 and the rectifier 21 so that during the conductive half cycle when the plate is positive, a positive potential is applied to the grid 3 when the switch 23 is closed. It is thus seen that in the arrangement of Fig. 6, which provides the means for sending bucking currents through the meter to secure greater accuracy over a wider range of plate currents, there is not the same freedom in the poling of the transformer winding 20 and rectifier 21 as in the instances dealt with in connection with Figs. 1 to 5.

To secure proper functioning of the testing arrangement of Fig. 6, I also provide a ballast resistor 48 in shunt to the serially connected transformer winding 20 and rectifier 21. Without such ballast resistor, errors would be introduced in the mutual conductance readings on the scale 30 of the instrument due to the effect of the voltage regulation of the transformer-rectifier combination of the instrument. If the voltage regulation is poor, which will be the case if the rectifier has a relatively high internal impedance, there will be a voltage drop in the transformer winding 20 and rectifier 21 when a load is applied to the circuit. This voltage drop will be different for different load resistances, depending upon the magnitude of the internal impedance of the transformer 10 and rectifier 21. This may be understood from the following considerations. When the bucking circuit is closed, the meter 18 carries a current which in combination with the plate current produces a certain deflection of the meter 18. When the switch 23 is then closed, and an additional load thrown on the transformer-rectifier source, producing a reduction of the terminal voltage across the source, this will immediately affect the flow of the bucking current so that it will be impossible to get a good and accurate reading, as the reading of the instrument will then be affected not only by the change in the resistance R of the resistor 26 included in the circuit, but also by the internal drop in the supply-source-rectifier combination. This difficulty is overcome by my arrangement, first by using a rectifier having low internal impedance, and second, by the use of the ballast resistor referred to above.

I have found that the copper oxide rectifiers which are sold in the trade under the trade-name "Rectox" perform very satisfactorily and have an internal drop sufficiently low so as to operate properly in the arrangement of my invention. However, for good accuracy, the use of the ballast resistor 48 is very desirable. The value of the resistance of the ballast resistor 48 should be so proportioned that current changes in the rest of the circuits produced by the closure of the various switches 23, 44, 45 and 46, and the adjustment of contact tap 29 shall be only a small percentage of the total current drawn by the ballast resistor 48. I have found that in the construction of practical instruments for ordinary use, very good results are obtained if the resistance of the resistor 48 is made about one-tenth or less of the resistance of the remainder of the load connected across the transformer-rectifier combination.

The arrangement of Fig. 6 is also helpful to illustrate another phase of my invention referred to later in connection with Fig. 7. For the proper functioning of such tube testers it is important that the voltages applied to the various elements of the circuit shall be of certain definite values, as otherwise the measured values of mutual conductance, amplification, etc. are difficult to correlate and interpret. In accordance with my invention the same instrument 18 which is used for determining the mutual conductance of the tube may also be used for determining the voltage applied to the tube elements. To this end I utilize an auxiliary circuit leading from the transformer winding 20 and rectifier 21 by way of the meter 18 including in the circuit sufficient resistance so that the meter operates as a voltmeter. Under such conditions, the resistance in the circuit may be so chosen that the deflection of the meter 18 gives direct indication of the voltage of the transformer winding 20.

Since the transformer 10 is as a rule of the type having good voltage regulation, the indication of the voltage of one of the windings will constitute a good check of the voltages in the other windings so that by suitable calibration, the meter 18 may be used as a good indication of the voltage applied to the primary transformer winding 11 and to the cathode. By including a suitable regulating device in the supply circuit of the transformer and utilizing such auxiliary meter circuit, the voltage of the instrument may be adjusted preliminary to the testing operation so that each tube is tested at the proper potential. The circuit arrangement used in such case is similar to that shown in Fig. 6, for instance, a resistor like the resistors 41, 42 and 43 is arranged to be connected by a switch such as switch 46 between the conductor 22 leading from the rectifier 21 and the conductor 17 leading to the meter. By closing this meter circuit switch, such as switch 46, prior to the testing of the tube, a current flow will be produced through the meter and if the meter is suitably calibrated, the voltage regulating device included in the supply circuit may be adjusted so as to have across supply terminals of the transformer 10, a voltage of the correct value for testing the tubes. The tube may then be tested in the regular way as described before.

Figure 7:
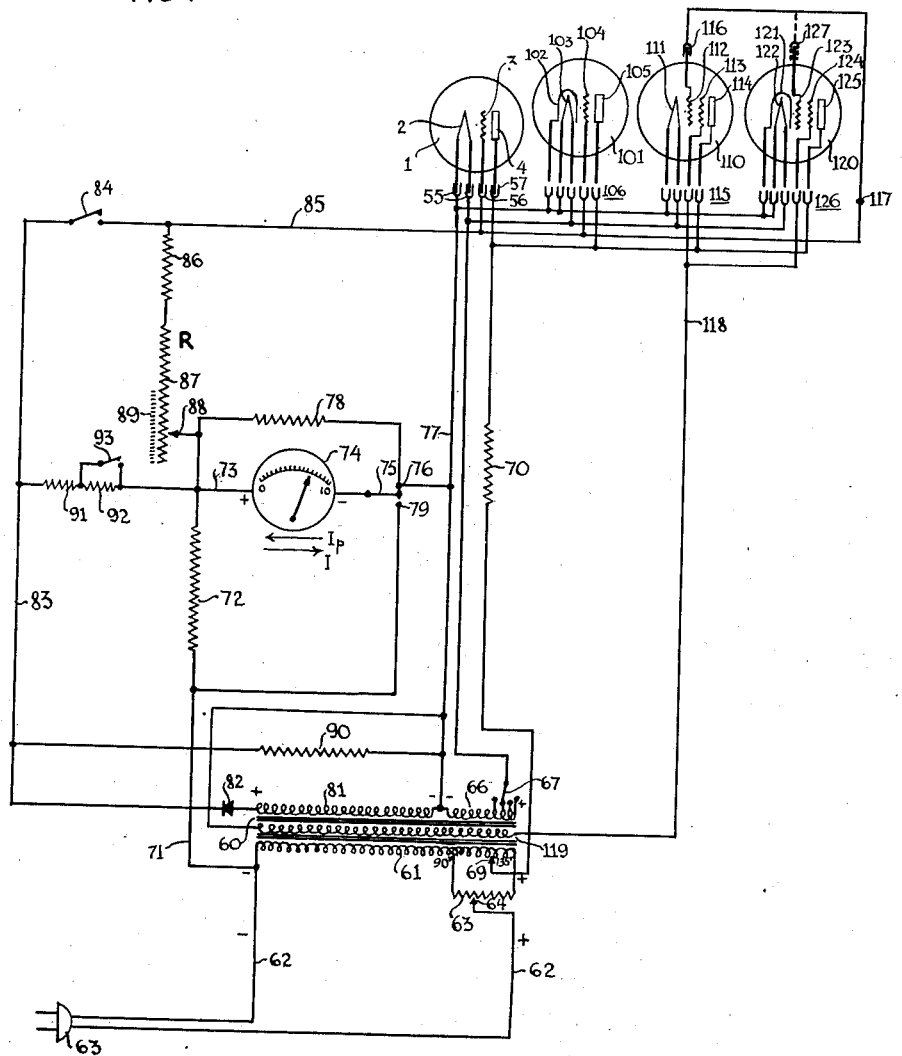

In Fig. 7 I have shown my invention in the form in which I embodied it in a commercial all-around tube testing device. This arrangement of Fig. 7 follows the principles of the arrangement shown in Fig. 1, but is characterized by a number of additional features which extend its utility and simplify the operation of the tester.

As shown in the drawings, a tube 1 with a cathode 2, grid 3 and anode 4 is arranged for mounting in a socket having cathode terminals 55, grid terminal 56 and plate terminal 57. The tube and the testing circuits are supplied by a transformer 60 having a primary winding 61 that is supplied through a conductor 62 from a plug 63 that may be inserted in a regular wall socket of a domestic alternating current 110-volt supply. The cathode 2 is connected to a secondary winding 66 of the transformer which is provided with a tap switch 67 so as to permit application of different voltages to the cathode of the tube, depending on the type of tube tested. In the practical tester built by me, I have provided on the tap switch five tap contacts so as to permit energization of the cathode with voltages of either 1.5, 2.5, 3.3, 5.0 or 7.5 volts corresponding to the rated cathode voltages of the current tubes.

The voltage applied to the plate is tapped off from the winding 61 by means of a tap 69. The plate circuit includes a current-limiting resistor so as to prevent a dead short circuit in the plate circuit in case the tube is defective. A cut-out switch may be connected in shunt of this resistance 70 so as to cut it out after preliminarily establishing that there is no short circuit in the plate circuit of the tube.

To permit adjustment of the voltage applied to the transformer 60, a resistor 63 is connected in shunt across the portion of the transformer winding 61, and one of the supply leads 62 is arranged to supply the current to said shunting resistor by means of a slidable tap contact 64. By sliding this tap contact 64 back and forth, the effective voltage across the windings of the transformer may be easily regulated.

As in the arrangement of Fig. 1, the plate circuit is completed by a connection from the other current supply lead 62 through conductor 71, resistor 72, conductor 73, meter 74, switch 75, switch contact 76 to the lead 77 leading to one of the cathode terminals of the device. A resistor 78 constitutes a shunt for the meter 74 and is connected between the conductor 73 and the switch contact 76. The switch 75 has in addition to its front contact 76 also a back contact 79 so that the meter 74 may be connected in shunt to resistor 72 in which case the resistor 72 serves as a shunt for the meter. The purpose of this arrangement will be explained later.

An auxiliary circuit is established from the transformer winding 81 through rectifier 82, conductor 83, switch 84, resistor 86, resistor 87, adjustable contact tap 88 and thence through the meter 74, switch 75, switch contact 76, back to the transformer winding 81. A resistor 90 connected across the transformer winding 81 and rectifier 82 serves as a ballast resistor, like the resistor 48 in the arrangement of Fig. 6. A scale 89 is arranged so as to permit reading of the mutual conductance from the adjustment of the contact tap 88 along the resistor 87.

An auxiliary circuit is established by connecting between the meter 74 and the conductor 83 leading from the rectifier a pair of resistors 91, 92, one of these resistors being arranged to be cut out by a switch 93.

The foregoing tester arrangement embodies in itself most of the features of importance in the operation of tube testers which have been described individually in connection with the various arrangements dealt with hereinbefore. A particular feature of this arrangement is the fact that the meter 74 automatically acts as an insrument for measuring the voltage applied to the transformer 60 and therefrom to the tube circuits, under elimination of any special switches or switch processes. In the practical arrangement built by me in accordance with Fig. 7, the various circuit elements had the following values:

The primary winding 61 and the tap resistor 64 were so adjusted that on application of a voltage of about 110 volts to the contact tap 64, the voltage across the ends of the transformer winding was 135 volts, and the inner end of the resistor 63 was connected to a tap on the transformer winding 61 having a voltage of 90 volts. The winding 81 was so designed as to give a voltage of 8 volts. Ballast resistor 90 had a resistance of 25 ohms. The fixed resistance 86 had 500 ohms and the variable resistance 87, 5,000 ohms. Resistances 91 and 92 had each 125 ohms. The resistor 78 constituted a ten-milliampere shunt for the meter 74 and the resistor 72 constituted a 100-milliampere shunt for the meter 74 when the switch 75 was down. The plate current limiting resistor 70 had a resistance of 1,000 ohms. The regulating resistor 63 was made 100 ohms. It is understood of course that I am giving these values not with a view to limiting my invention, but rather to enable those who are not skilled in the art to readily build a practical tube tester in accordance with the principles of my invention.

The meter 74 is connected in the circuit, not in the regular way, but with reverse polarity. What would be the regular poling of the meter is shown in Figs. 1 to 5, where the (+) and (−) signs on the sides of the meter indicate its poling in the circuit. In the arrangement of Figs. 1 to 6, the meter is so connected that when the plate circuit flows through the meter it produces a deflection from the zero position to a point corresponding to the indication of the current flow from the plate to the cathode. In distinction therefrom, the arrangement of Fig. 7 is such that when the tube 1 is connected in the circuit, the plate current will tend to move the pointer out of the scale past the zero point thereof; or in other words, the meter is connected with reverse polarity against the normal direction of the plate current. The reason for this arrangement will be clear from the following description of the operation of the instrument.

When the tube 1 is to be tested, the instrument is first checked up as to whether it has applied to its circuits the correct operating voltages. This is obtained by direct reading on the scale of the instrument 74, the resistors 91 and 92 being so chosen and the meter 74 with its circuits being so adjusted, that with the normal operating voltage, a current is produced from the transformer winding 81 by way of the rectifier 82, resistors 91, 92 and the meter 74 as to deflect the pointer to a predetermined position which may be specially marked in the instrument either in red or by the designation "normal".

In the practical arrangement according to Fig. 7, I have so adjusted the circuit constants that under normal voltage conditions, with the tubes removed from the socket terminals, the meter will give a full scale deflection, the pointer in this case being opposite the 10-milliampere point on the scale. If the meter points to a different place on the scale, the tap contact 64 is adjusted until the pointer is brought to the predetermined point on the scale, say 10 in the instance now under consideration. The tube that is to be tested is now inserted in the socket terminals 55 to 57. This will cause a flow of current from the plate 4 to the cathode 2 of the tube and thence by way of the meter 74 in the direction of the arrow marked $I_p$, reducing the full scale deflection of the pointer by an amount corresponding to the plate current. For instance, if the plate current is 4 milliamperes, the pointer of the meter 74 will return from the point 10 on the scale to the point 6 on the scale. Thereupon the contact tap 88 is adjusted along the resistor 87 until the point is reached when closure of the switch 84 does not affect the deflection of the instrument one way or another, i. e., the pointer, in the instance referred to above, will stay at the point "6" on the scale with the switch 84 closed as well as open. In this respect, the testing operation is exactly like that followed with the arrangement of Fig. 1, the scale 89 on the instrument permitting direct determination of the mutual conductance of the tube, depending on the adjustment of the contact tap 88 on the resistor 87.

In the instance discussed above, it has been assumed that the meter 74 has a full scale deflection of 10 milliamperes. If a tube is tested that has a plate current of more than 10 milliamperes, say 15 milliamperes, then the insertion of the tube in the socket terminals of the instrument will throw the pointer of the meter 74 past its zero position on the scale. In order to bring the pointer back on the scale of the instrument, I produce a flow of bucking current by sending an additional 10 milliamperes through the meter 74 in the original direction of flow from the transformer winding 81 by closing the switch 93. The resistance 92 cut out by the switch 93 is so proportioned that upon cutting out of this resistance a current I of 20 milliamperes will flow through the meter 74 as against the flow of current of 10 milliamperes when the switch 93 is open.

It is seen from the foregoing that all that it is necessary to do in order to test a tube by the arrangement of Fig. 7 is first to adjust the resistance tap 64 until the meter 74 shows full deflection; the tube is then inserted; if the pointer is within the range of the meter 74, the mutual conductance is determined by sliding the contact 88 until the closure of the switch 84 leaves the instrument reading unaffected; if the pointer of the meter has been thrown out of the scale by the insertion of tube 1, switch 93 is closed, which brings the pointer back within the scale and thereupon the tap 88 is adjusted until the closure of the switch 84 leaves the pointer unaffected.

In order to permit testing of tubes using indirectly heated cathodes such as tube 1 having an indirectly heated cathode 102 that is heated by heater filament 103, and in addition, from the grid 104 and plate 105, I provided on the instrument an additional socket 106 having socket terminals adapted to engage the electrode prongs leading from the various electrodes of the tube. A socket terminal arranged to engage the prong on the indirectly heated cathode 102 is connected directly to one of the heater filament socket terminals so that the testing of the tube 101 may be proceeded with in exactly the same manner as with the testing of an ordinary three-electrode tube 1.

In order to permit ready and correct testing of screen-grid tubes such as tube 110 having a cathode 111, control grid 112 and screen-grid 113, and an anode 114, I provide an additional set of socket terminals 115 of which the terminals leading to the cathode prongs of the tube are connected in parallel to the socket terminals 55 of the tube 1, and the socket terminal leading to the plate 110 is connected in parallel to the plate socket terminal 57. The socket terminal adapted to engage the prong leading from the screen grid 113 is connected to a special winding 119 on the transformer 60, the other terminal of which is connected to the cathode supply conductor 77 of the arrangement. The winding 119 is so designed and poled that when the plate of the tube has applied to itself a positive potential the transformer winding 119 will supply the socket terminals connected to it with a positive potential of about 50 volts, it being of course possible to vary this voltage in accordance with the requirements. The grid voltage is applied to the control grid 112 of the tube by a connection from the control grid prong on the top of the tube to an auxiliary grid supply terminal 117 on the instrument, which grid supply terminal 117 is connected in parallel with the control grid socket terminal 56 of tube 1.

I also provide on the instrument an additional socket 126 for testing indirectly heated screen-grid tubes 120 having an indirectly heated cathode 121, a filamentary heater 122, a control grid 123, a screen grid 124 and a plate 125. The socket terminals 126 for this tube are connected similarly to the socket terminal on the screen-grid tube 110, their being only an additional socket terminal for engaging the cathode prong of the tube, this socket terminal being connected in parallel with one of the heater terminals.

The arrangement of Fig. 7 is also adapted for utilization as a tester for hot cathode rectifier tubes such as are used in modern radio sets. In rectifier tubes it is only important to determine the filament emission or the plate current. Such tube is tested by inserting the tube with its prongs in the socket terminals 55 and 57, their being no grid in such tube. Thereupon, the switch 75 adjacent to the meter 74 is thrown to the downward position into engagement with the contact 79. This reverses the direction of connection of the meter 74 in the circuit from the plate and the cathode of the rectifier tube, the current flowing now from the cathode prong 55 by way of the conductor 77, contact 76, conductor 78, conductor 73, meter 74, switch 75, conductor 79 to conductor 71 of the plate supply source. With these connections the resistor 72 serves as a shunt for the meter. As explained above, in the instance here described, the resistance 72 is so dimensioned as to make the meter range 100 milliamperes, since the plate current in the regulation run of rectifiers used in modern sets runs up to about 100 milliamperes.

As seen from the foregoing, one of the principal features of the arrangements of the invention is based upon the idea of balancing the auxiliary rectified alternating current derived from an alternating current source with the changes in the plate currents of grid-controlled tubes that are supplied from such source. In the preferred arrangements for determining the mutual conductance, rectified alternating currents derived from the source are sent through auxiliary circuits from which a voltage is applied to the control grid of the tube and the changes in the plate currents produced by the voltage applied to the grid are correlated or balanced against changes of current in an auxiliary conductance included in the circuit of the auxiliary rectified alternating current flow.

In addition, I have shown and described a great many other features which are of importance in the construction and operation of practical tube testers. Many of the features described in this application are not limited to tube testing and tube testers, but have application in other arrangements, such as relay devices and the like.

Many modifications of my invention will suggest themselves to those skilled in the art and I desire that the appended claims be given a broad construction commensurate with the scope of the invention.

I claim:
1. The method of testing grid controlled space-discharge tubes which comprises applying a source of alternating current to the plate circuit of said tube to produce a flow of current from the plate to the cathode of the tube, producing an auxiliary flow of rectified alternating current from said source during the period when the plate potential is positive, utilizing the auxiliary current flow to apply a control potential to the grid of the tube, and utilizing the combined effects of the auxiliary rectified current and the plate current change effected by the application of said control potential to said grid to indicate the characteristics of said tubes.

2. The method of testing grid controlled space-discharge tubes which comprises applying a source of alternating current to the plate circuit of the tube for sending current pulses from the plate to the cathode thereof, applying to an auxiliary conductance and grid of the tube voltages derived from a rectified alternating current flowing from said source independently from the flow of current through said tube, and balancing the resulting current through said auxiliary conductance against the current changes produced by the applied grid voltages in the plate current of the tube to produce an indication of the characteristics of said tube.

3. The method of testing grid controlled space-discharge tubes which comprises energizing the plate circuit and the cathode of the tube from an alternating current source, producing an auxiliary flow of rectified alternating current from said source during the period when the plate potential is positive, utilizing the auxiliary current flow to apply a potential to the grid of said tube and to send a current through an auxiliary conductance, adjusting the circuit conditions until the current in the auxiliary conductance is in predetermined relationship to the plate current flow produced by the application of the potential derived from said auxiliary current flow to said grid, and actuating an instrument by the differential action of said auxiliary current and the plate current flow produced by the auxiliary current to indicate the predetermined relationship of said currents.

4. In a tester of space discharge tubes of the type comprising a cathode, a grid and an anode, terminals for engaging the cathode, grid and anode terminals of the tube, a source of alternating current, connections from said source to the terminals leading to said cathode for heating the same, connections for applying the potential of said source to the terminals leading to said anode and to said cathode, means for producing during the period when the plate potential is positive and passes a discharge an independent auxiliary flow of rectified alternating current from said source, means for applying a potential derived from said auxiliary rectified alternating current flow to the terminal leading to the grid of said tube, an auxiliary conductance included in the circuit of said auxiliary rectified current flow, means for adjusting the circuit conditions of said auxiliary current flow and said plate current flow until the current in the auxiliary conductance is in predetermined relationship to the current flow produced in the plate circuit of said tube by the application of a control potential to the terminal leading to said grid, and an instrument arranged to be actuated by the differential action of said auxiliary current flow and the plate current flow produced thereby to indicate said relationship.

5. In a tester of space discharge tubes of the type comprising a cathode, a grid and an anode, terminals for engaging the cathode, grid and anode terminals of the tube, a source of alternating current, connections from said source to the terminals leading to said cathode for heating the same, connections for applying the potential of said source to the terminals leading to said anode and to said cathode, an auxiliary circuit including an auxiliary conductance, means for producing an independent auxiliary flow of direct current through said auxiliary circuit during the period when the plate potential applied to said tube is positive and passes a discharge, means for applying a potential derived from said auxiliary direct current flow to the terminal leading to the grid of said tube, means for adjusting the circuit conditions in said auxiliary current flow and said plate current flow until the current in the auxiliary conductance is in predetermined relationship to the current flow produced in the plate circuit of said tube by the application of a potential from said auxiliary circuit to said grid, and an instrument actuated by the said auxiliary current flow and the plate current flow to indicate said relationship.

6. The method of testing grid controlled space-discharge tubes which comprises energizing the plate circuit and the cathode of the tube from an alternating current source, producing an auxiliary flow of direct current through an auxiliary circuit independent of the plate current through said tube during the period when the plate potential is positive, utilizing the auxiliary current flow to apply a potential to the grid of said tube and to send a current through an auxiliary conductance, adjusting the circuit conditions until the current in the auxiliary conductance is in predetermined relationship to the plate current flow produced by the application of the potential derived from said auxiliary current flow to said grid, and actuating an instrument by the differential action of said auxiliary current and the plate current flow produced by the auxiliary current to indicate the predetermined relationship of said currents.

7. In a tester of space discharge tubes of the type comprising a cathode, a grid and an anode, terminals for engaging the cathode, grid and anode terminals of the tube, a source of alternating current, connections from said source to the terminals leading to said cathode for heating the same, connections for applying the potential of said source to the terminals leading to said anode and to said cathode, means for producing during the period when the plate potential is positive and passes a discharge an independent auxiliary flow of rectified alternating current from said source, means for applying a potential derived from said auxiliary rectified alternating current flow to the terminal leading to the grid of said tube, an auxiliary conductance included in the circuit of said auxiliary rectified current flow, means for adjusting the circuit conditions of said auxiliary current flow and said plate current flow until the current in the auxiliary conductance is in predetermined relationship to the current flow produced in the plate circuit of said tube by the application of a control potential to the terminal leading to said grid, and an instrument arranged to be actuated by the differential action of said auxiliary current flow and the plate current flow produced thereby to indicate said relationship.

8. The method of testing screen grid controlled space-discharge tubes which comprises applying a source of alternating current to the plate circuit of said tube to produce a flow of current from the plate to the cathode of the tube, producing an auxiliary flow of rectified alternating current from said source during the period when the plate potential is positive, utilizing the auxiliary current flow to apply a control potential to the grid of the tube, and utilizing the combined effects of the auxiliary rectified current and the plate current change effected by the application of said control potential to said grid to indicate the characteristics of said tubes, while applying to the screen of said tube a potential at which current flowing by way of said screen leaves the combined effects of the auxiliary rectified current and plate current unaffected.

9. The method of testing screen grid controlled space-discharge tubes which comprises applying a source of alternating current to the plate circuit of the tube for sending current pulses from the plate to the cathode thereof, applying to an auxiliary conductance and grid of the tube voltages derived from an auxiliary rectified alternating current flowing from said source independently from the flow of current through said tube, and balancing the resulting current through said auxiliary conductance against the current changes produced by the applied grid voltages in the plate current of the tube to produce an indication of the characteristics of said tube, while applying to the screen of said tube a potential at which current flowing by way of said screen leaves the balancing effects of the auxiliary rectified current and plate current unaffected.

10. In a tester of space discharge tubes of the type comprising a cathode, a screen, a control grid and an anode, terminals for engaging the cathode, screen grid and anode terminals of the tube, a source of alternating current, connections from said source to the terminals leading to said cathode for heating the same, connections for applying the potential of said source to the terminals leading to said anode and to said cathode, means for producing during the period when the plate potential is positive and passes a discharge an independent auxiliary flow of rectified alternating current from said source, means for applying a potential derived from said auxiliary rectified alternating current flow to the terminal leading to the grid of said tube, an auxiliary conductance included in the circuit of said auxiliary rectified current flow, means for adjusting the circuit conditions of said auxiliary current flow and said plate current flow until the current in the auxiliary conductance is in predetermined relationship to the current flow produced in the plate circuit of said tube by the application of a control potential to the terminal leading to said grid, an instrument arranged to be actuated by the differential action of said auxiliary current flow and the plate current flow produced thereby to indicate said relationship, and means for maintaining the screen of said tube at a potential at which current flowing by way of said screen leaves the effects of the auxiliary rectified current and plate current on said instrument unaffected.

11. The method of testing screen grid controlled space-discharge tubes which comprises energizing the plate circuit and the cathode of the tube from an alternating current source, producing an auxiliary flow of rectified alternating current from said source during the period when the plate potential is positive, utilizing the auxiliary current flow to apply a potential to the grid of said tube and to send a current through an auxiliary conductance, adjusting the circuit conditions until the current in the auxiliary conductance is in predetermined relationship to the plate current flow produced by the application of the potential derived from said auxiliary current flow to said grid, and actuating an instrument by the differential action of said auxiliary current and the plate current flow produced by the auxiliary current to indicate the predetermined relationship of said currents, while passing an additional current from said source through said instrument for controlling the range thereof independent of the action of said auxiliary and said plate current on said instrument.

12. In a tester of space discharge tubes of the type comprising a cathode, a grid and an anode, terminals for engaging the cathode, grid and anode terminals of the tube, a source of alternating current, connections from said source to the terminals leading to said cathode for heating the same, connections for applying the potential of said source to the terminals leading to said anode and to said cathode, means for producing during the period when the plate potential is positive and passes a discharge an independent auxiliary flow of rectified alternating current from said source, means for applying a potential derived from said auxiliary rectified alternating current flow to the terminal leading to the grid of said tube, an auxiliary conductance included in the circuit of said auxiliary rectified current flow, means for adjusting the circuit conditions of said auxiliary current flow and said plate current flow until the current in the auxiliary conductance is in predetermined relationship to the current flow produced in the plate circuit of said tube by the application of a control potential to the terminal leading to said grid, an instrument arranged to be actuated by the differential action of said auxiliary current flow and the plate current flow produced thereby to indicate said relationship, and means for passing an additional current from said source through said instrument for controlling the range thereof independent of the action of said auxiliary and said plate current on said instrument.

DAVID E. SPARKS.